S. MacC. JONES.
ADJUSTABLE SCHOOL DESK AND SEAT.
APPLICATION FILED APR. 6, 1912.
1,033,591.
Patented July 23, 1912.
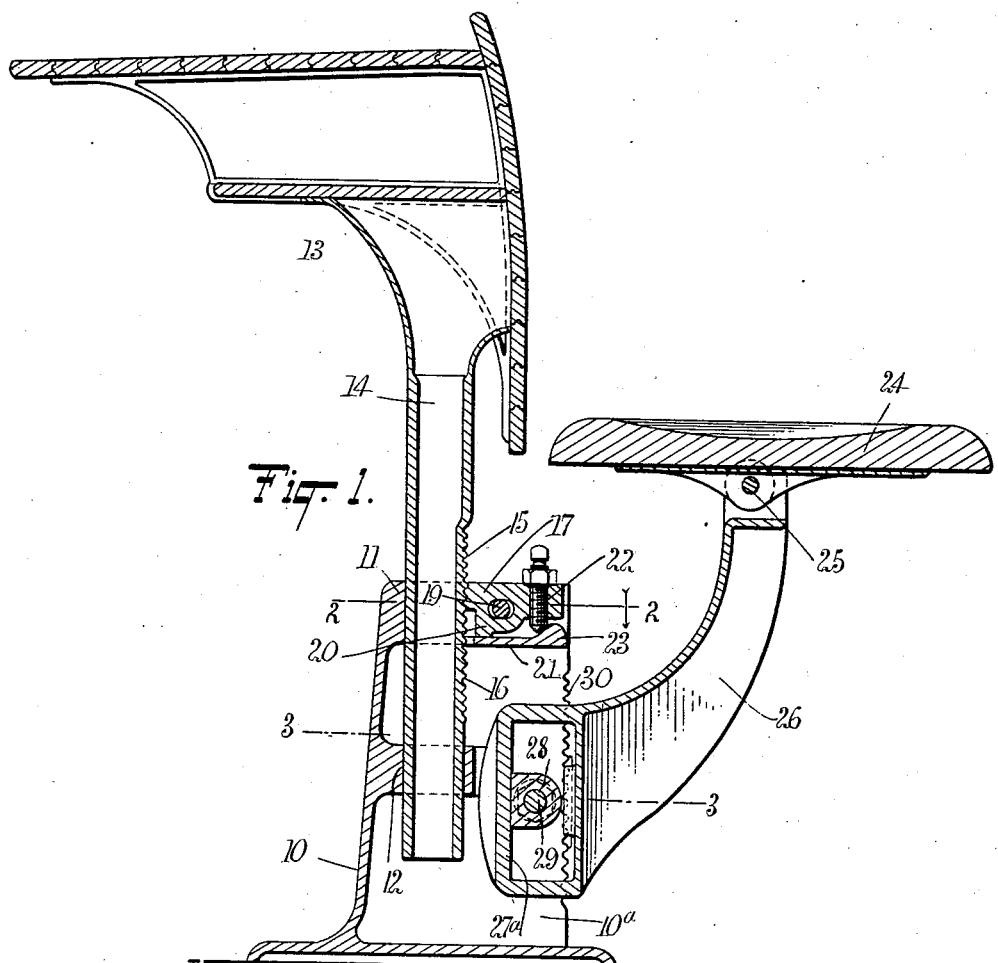
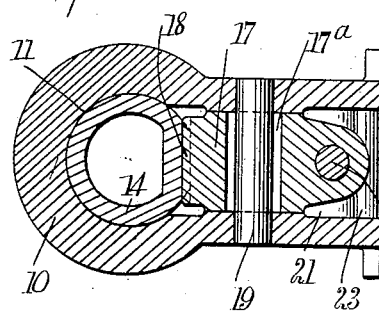
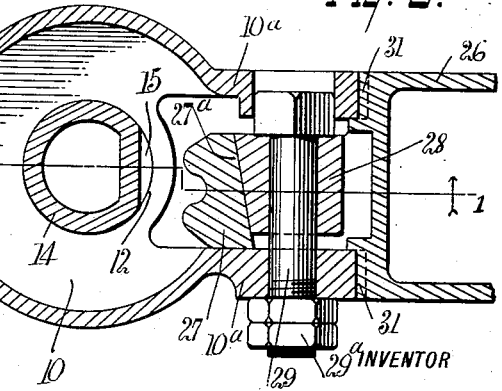
WITNESSES
George Bamlay
Geo. L. Beeler
INVENTOR
Samuel MacC. Jones
BY
ATTORNEYS

UNITED STATES PATENT OFFICE.

SAMUEL MacC. JONES, OF WILKINSBURG, PENNSYLVANIA.

ADJUSTABLE SCHOOL DESK AND SEAT.

1,033,591.      Specification of Letters Patent.      Patented July 23, 1912.

Application filed April 6, 1912. Serial No. 688,960.

*To all whom it may concern:*

Be it known that I, SAMUEL MacC. JONES, a citizen of the United States, residing in Wilkinsburg, county of Allegheny, State of Pennsylvania, have invented a new and Improved Adjustable School Desk and Seat, of which the following is a full, clear, and exact description.

The invention relates to desks and seats for audience rooms, especially school rooms where it is desirable for the furniture to be adjusted in accordance with the stature of the several persons to use the same. In some jurisdictions it is required by law that every school seat and desk must be so arranged as to insure comfort to the pupil in accordance with his age or size. Under ordinary structural conditions of school furniture, it is practically impossible to meet the requirements of this law without providing a large number of different sizes of seats and desks. Moreover this is not expedient because of the crowded condition of most school rooms and the fact that the population thereof is more or less transitory. I have found by practical experience that the number of different sizes of school desks made in accordance with my invention may be reduced even more than one-half and yet easily come within the requirements above referred to.

The invention in a preferred embodiment is hereinafter fully described and claimed and illustrated in the accompanying drawings, in which the several parts are referred to by like reference characters throughout the figures, and in which, Figure 1 is a vertical longitudinal section on the line 1—1 of Fig. 3; Fig. 2 is a transverse detail on the line 2—2 of Fig. 1; and Fig. 3 is a similar view substantially on the line 3—3 of Fig. 1.

The device comprises a pedestal 10 adapted to be secured to the floor in any suitable manner and including a substantially cylindrical vertical socket 11, and preferably though not necessarily a similar socket 12 below and alining with the socket 11.

At 13 is indicated any suitable form of desk having a depending support or stem 14 substantially snugly fitted into the aforesaid sockets 11 and 12. One side of the stem is flattened at 15 and provided with horizontal teeth or corrugations 16.

Carried by the pedestal 10, preferably at its upper end, is a locking means comprising a dog 17 having one or more transverse teeth or corrugations 18, coöperating with the corrugations 16 of the stem. Said dog has a transverse elliptical hole $17^a$ through which extends a pin 19 whereby the dog is prevented from vertical displacement with respect to the pedestal. The form of said hole permits sufficient movement of the dog to allow the coöperating corrugations of the dog and stem to be separated far enough for the desk and stem to be adjusted up or down.

At 20 is indicated a shoulder of the dog arranged so as to bear against a shelf or ledge 21 of the pedestal, whereby when the desk is adjusted vertically the dog will automatically catch and temporarily hold the desk in place, the dog at such time being free to tilt upwardly at the corrugated end 18. As a convenient means to lock the dog in coöperating position with the stem, there is provided a screw 22 adapted to be turned downwardly against a rib 23, whereby the dog is forced toward the stem and and the shoulder 20 is caused to impinge positively against said shelf 21. This construction not only prevents the desk from vertical displacement, but through the flattened form of the stem the dog prevents any possibility of movement of the desk around the axis of the stem.

The seat 24 may be of any suitable construction, but as shown is pivoted at 25 to a bracket or arm 26 adjustable vertically on the pedestal 10. Said arm 26 includes a yoke 27 extending rearwardly between the side walls $10^a$ of the pedestal. Said yoke has a plane front face $27^a$, arranged vertically, but at an angle to the plane of the arm and within said yoke and between said side plates of the pedestal is a laterally movable wedge 28 having connected thereto a bolt 29 extending through said side plates. The arrangement is such that when the bolt is operated as through the nuts $29^a$, the wedge 28 will be drawn so as to cause the arms to be brought snugly into coöperative relation with corrugations or teeth 30 and 31 on the pedestal and arm respectively, whereby it is impossible for the seat to become displaced vertically by accident. In order to adjust the seat up or down, it is but necessary to loosen the nuts $29^a$ and wedge 28, so as to permit the teeth 30 and 31 to become separated. After adjustment the locking means for the seat will be such as before described.

It is to be understood that the several parts of this desk and seat may be variously constructed, as to materials or relative sizes and proportions, according to the exigencies or requirements of any particular demand, and I do not wish to be limited to the features illustrated except as may be required by the state of the art.

Having thus described my invention, I claim as new and desire to secure by Letters Patent:

1. In a device of the character set forth, the combination of a pedestal having a vertical socket and a transverse shelf adjacent said socket, a desk including a stem fitted into said socket and provided with a flat side having transverse corrugations, a locking dog carried by said pedestal and having a shoulder coöperating with said shelf and also having a transverse tooth coöperating with said stem corrugations, a transverse pin extending through the dog and preventing the vertical displacement thereof, and a vertically movable screw connected with the dog and serving to lock it in position with the aforesaid corrugations and tooth in coöperation.

2. In a device of the character set forth, the combination of a pedestal having a pair of spaced side plates, a bolt extending transversely through the stem, a seat bracket having a yoke extending rearwardly between said plates and embracing said bolt, said pedestal, plates and arm having coöperating transverse teeth, and a wedge within said yoke mounted upon and operated by said bolt to cause the arm and pedestal to be positively locked in adjusted position.

In testimony whereof I have signed my name to this specification in the presence of two subscribing witnesses.

SAMUEL MacC. JONES.

Witnesses:
H. J. BOOTH,
JOHN B. ELLIOTT.

---

Copies of this patent may be obtained for five cents each, by addressing the "Commissioner of Patents Washington, D. C."